J. H. MARTIN.
MEASURING AND DESCRIBING INSTRUMENT.
APPLICATION FILED JAN. 8, 1921.
1,397,816.
Patented Nov. 22, 1921.
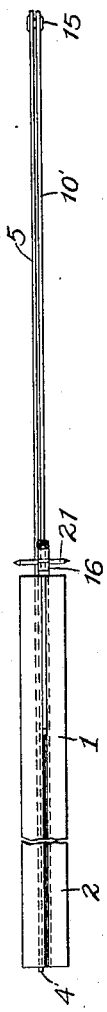
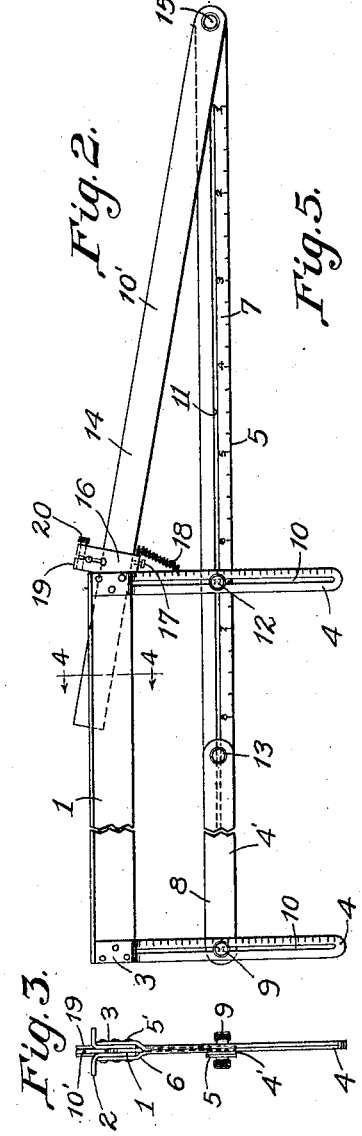
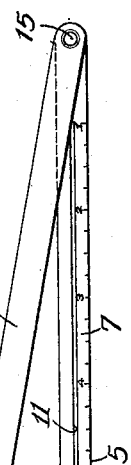
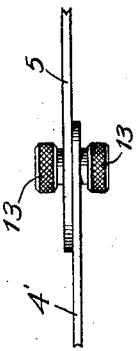
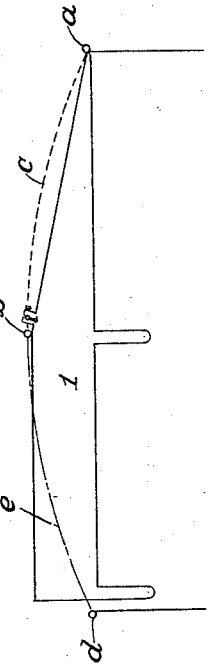
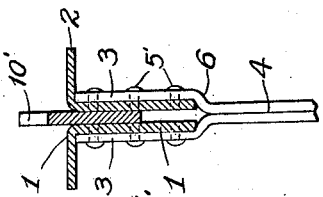
INVENTOR.
JOHN H. MARTIN
BY
Mason Fenwick Lawrence
ATTORNEYS.

UNITED STATES PATENT OFFICE.

JOHN H. MARTIN, OF NEW HARTFORD, NEW YORK.

MEASURING AND DESCRIBING INSTRUMENT.

1,397,816.      Specification of Letters Patent.      Patented Nov. 22, 1921.

Application filed January 8, 1921. Serial No. 435,965.

*To all whom it may concern:*

Be it known that I, JOHN H. MARTIN, a citizen of the United States, residing at New Hartford, in the county of Oneida and State of New York, have invented certain new and useful Improvements in Measuring and Describing Instruments; and I do hereby declare the following to be a full, clear, and exact description of the invention, such as will enable others skilled in the art to which it appertains to make and use the same.

This invention relates to new and useful improvements in measuring instruments and more particularly to an instrument adapted for use in describing an arc over a door, window or other similar opening, the main object of the present invention being the provision of an instrument of the above character which can be quickly and readily adjusted to describe an arc of any width or height.

Another object of the present invention is the provision of a measuring instrument of the above character which is extremely simple in construction and operation and can be manufactured and placed upon the market at a comparatively small cost.

With the above and other objects in view the invention consists in the novel features of construction, combination and arrangement of parts hereinafter more fully set forth, pointed out in the claims and shown in the accompanying drawings in which:

Figure 1 is a top plan view of an instrument constructed in accordance with my invention;

Fig. 2 is a side elevation;

Fig. 3 is an end elevation;

Fig. 4 is a transverse sectional view taken on the line 4—4 of Fig. 2;

Fig. 5 is a detail top plan view illustrating the adjustment between the two horizontally disposed members;

Fig. 6 is a diagrammatic view showing the relative position of the instrument prior to the describing of one-half the arc.

In the construction of my improved instrument I employ two spaced parallel members 1 having horizontally disposed flanges 2 at their upper edges and securely held in spaced parallel relation by the spaced end portions 3 of the arms 4. These arms 4 are preferably constructed of a single strip of material bent upon themselves whereby the end portions 3 will be disposed upon the exterior of the members 1 at each end thereof and riveted or otherwise secured thereto as shown at 5. It will be noted that when the ends of the bar 4 are brought together they are bent slightly upward away from the main portion of the arm 4 as at 6 and thence directed in spaced relation to be disposed upon the outsides of the members 1.

Arranged transversely of the arms 4 is a sectional bar, including the main section 7 and connecting section 8, the section 8 being provided with an adjusting screw 9 adapted to operate within the slot 10 in one of the arms 4, it being noted that both of these arms 4 are provided with the longitudinal slots 10. The member 7 is provided with a longitudinal slot 11 and in order to retain the member 7 in various adjusted positions with respect to the members 4, an adjusting screw 12 is provided whereby the member 7 is connected to one of the members 4 after being adjusted to the required position. The inner ends of the members 7 and 8 are hingedly connected by means of a transverse screw member having thumb pieces 13 formed in each end, the screw member being disposed within the slot 11 and extended through the inner end of the member 8 whereby the member 7 can be longitudinally adjusted when desired and securely retained in adjusted position by means of the thumb pieces 13.

A movable arm 14 is pivotally connected to the outer end of the member 7 as shown at 15 and adapted to be normally disposed in an inclined position with respect to the member 7 as shown in Fig. 2, the free end of the arm 14 being adapted to rest within the space formed by the members 1 and 2 and resting upon the ends of the arms 4 at the point where they are extended in opposite direction as at 6.

Slidably mounted upon this arm 14 is a loop 16 carrying a set screw 17 adapted to engage with the arm 14 to retain the loop in various adjusted positions upon the arm. In order to retain the arm 14 in its normal inclined position so that the free end thereof will be disposed within the space formed by the members 1, a coiled spring 18 is connected to the loop 16 at one end while the other end is connected to one of the arms 4 to thus retain the arm 14 in its normal operative position and also to retain the loop 16 in a position adjacent to the body, The loop 16 is provided with clamping portions 19 having a set screw 20 whereby a pencil or other marking instrument 21 may be disposed between the clamping members 19 and securely retained in position by adjustment of the screw 20.

The general operation of my improved instrument is clearly illustrated in Fig. 6 in which it will be noted that the end of the instrument where the arm 14 and the member 7 are pivotally connected, is placed against a nail or pin driven into a board lying flat from which the pattern is to be cut, generally indicated at *a* while the second pin *b* is arranged at the center of the opening and directly above the horizontal portions 2 of the members 1. For example the instrument as shown in Fig. 2 is provided with graduations along the lower edge of the member 7 representing a number of feet while the arms 4 are provided with graduations upon one edge representing a number of inches and the instrument is set in Fig. 2 for describing an arc over a door or window opening 13 feet wide and six inches high. After the instrument has been placed in the position illustrated in Fig. 6, the entire instrument will be moved to the right, the arm 14 passing beneath the pin *a* while the horizontal portions 2 of the members 1 will pass beneath the pin *b* whereby the marking instrument 21 will describe the one-half arc as shown at *c* illustrated in dotted lines. Now in order to describe the other half of the arc the instrument is reversed so that the pivot 15 is arranged beneath the pin *d* and the instrument is then moved to the left, the marking instrument 21 describing the half of the arc indicated at *e*.

From the above description taken in connection with the accompanying drawing it will be readily apparent that I have provided a simple and durable instrument which can be quickly and readily adjusted for describing an arc above a doorway or window opening of any desired width and height.

I claim as my invention:

1. An instrument of the class described including a horizontal body portion, arms projecting at right angles therefrom and arranged in spaced relation, an adjustable bar movable over said arms, a movable arm pivotally connected to one end of the bar and having its other end loosely engaging the body member, and a marking instrument adjustably mounted upon said movable arm at a point adjacent one end of the body as and for the purpose set forth.

2. An instrument of the class described including a body comprising spaced angular members, slotted arms having one of their ends bifurcated and connected to the exterior of the angular members, an adjustable bar disposed parallel with the body portion and arranged for adjustment with respect to the arms toward or away from the body portion, a pivoted arm connected to one end of the bar and having its other end loosely mounted in the body between the spaced member thereof and a marking instrument carried by the pivoted arm at a point adjacent one end of the body.

3. An instrument of the class described including a body comprising spaced angular members, slotted arms having one of their ends connected to the vertical portions of the angular members and disposed beneath the horizontal portions thereof, a bar arranged transversely across the arms and adjustable longitudinally thereof, a pivoted arm connected to one end of the bar and normally resting between the spaced angular members at one end thereof, means for retaining the end of the pivoted arm in its adjusted position, and a marking instrument carried by the pivoted arm adjacent to one end of the body as and for the purpose set forth.

In testimony whereof I affix my signature.

JOHN H. MARTIN.